(12) United States Patent
Narayanaswami

(10) Patent No.: US 8,981,928 B2
(45) Date of Patent: Mar. 17, 2015

(54) SYSTEMS, METHODS, AND COMPUTER PROGRAM PRODUCTS FOR REPORTING CONDITION OF FIRST ENTITY TO SECOND ENTITY

(71) Applicant: International Business Machines Corporation, Armonk, NY (US)

(72) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/670,227

(22) Filed: Nov. 6, 2012

(65) Prior Publication Data

US 2014/0118142 A1    May 1, 2014

Related U.S. Application Data

(63) Continuation of application No. 13/662,295, filed on Oct. 26, 2012.

(51) Int. Cl.
| | |
|---|---|
| *G08B 1/08* | (2006.01) |
| *G06Q 10/06* | (2012.01) |
| *G06Q 30/02* | (2012.01) |
| *G08B 25/00* | (2006.01) |

(52) U.S. Cl.
CPC ........ *G06Q 10/0635* (2013.01); *G06Q 30/0252* (2013.01); *G08B 25/006* (2013.01)
USPC .............. 340/539.13; 340/539.1; 340/539.11

(58) Field of Classification Search
CPC combination set(s) only.
See application file for complete search history.

(56) References Cited

U.S. PATENT DOCUMENTS

| | | | |
|---|---|---|---|
| 7,348,882 B2 * | 3/2008 | Adamczyk et al. | 340/539.18 |
| 7,630,986 B1 | 12/2009 | Herz et al. | |
| 7,974,714 B2 | 7/2011 | Hoffberg | |
| 8,015,010 B2 | 9/2011 | Basir | |
| 8,334,766 B2 * | 12/2012 | Teran-Matus et al. ... | 340/539.13 |
| 8,688,474 B2 | 4/2014 | Walter et al. | |
| 2003/0208381 A1 | 11/2003 | Walter et al. | |
| 2006/0202819 A1* | 9/2006 | Adamczyk et al. | 340/539.18 |
| 2006/0250234 A1 | 11/2006 | Maschke | |
| 2007/0053513 A1 | 3/2007 | Hoffberg | |
| 2007/0072583 A1* | 3/2007 | Barbeau et al. | 455/404.2 |
| 2009/0210442 A1 | 8/2009 | Klimczak | |
| 2010/0253506 A1* | 10/2010 | Teran-Matus et al. ... | 340/539.13 |
| 2011/0121991 A1 | 5/2011 | Basir | |
| 2011/0175724 A1* | 7/2011 | Kent | 340/539.13 |
| 2011/0246606 A1 | 10/2011 | Barbeau et al. | |
| 2013/0141233 A1* | 6/2013 | Jacobs et al. | 340/521 |

OTHER PUBLICATIONS

Markoff, John; "Government Aims to Build a 'Data Eye in the Sky'", New York Times, Oct. 10, 2011.

(Continued)

*Primary Examiner* — Travis Hunnings
(74) *Attorney, Agent, or Firm* — Anne V. Dougherty, Esq.; McGinn IP Law Group, PLLC

(57) ABSTRACT

A system for reporting a condition of a first entity to a second entity, the system includes a processor that executes instructions to determine the condition of the first entity based on an aggregation of structured and unstructured information and entity-activity information of the first entity, and a reporting unit that reports the condition of the first entity to the second entity.

25 Claims, 12 Drawing Sheets

(56) References Cited

OTHER PUBLICATIONS

United States Office Action dated Dec. 17, 2013, in U.S. Appl. No. 13/662,295.

International Search Report dated Apr. 23, 2014.
United States Office Action dated Apr. 10, 2014 in U.S. Appl. No. 13/662,295.

* cited by examiner

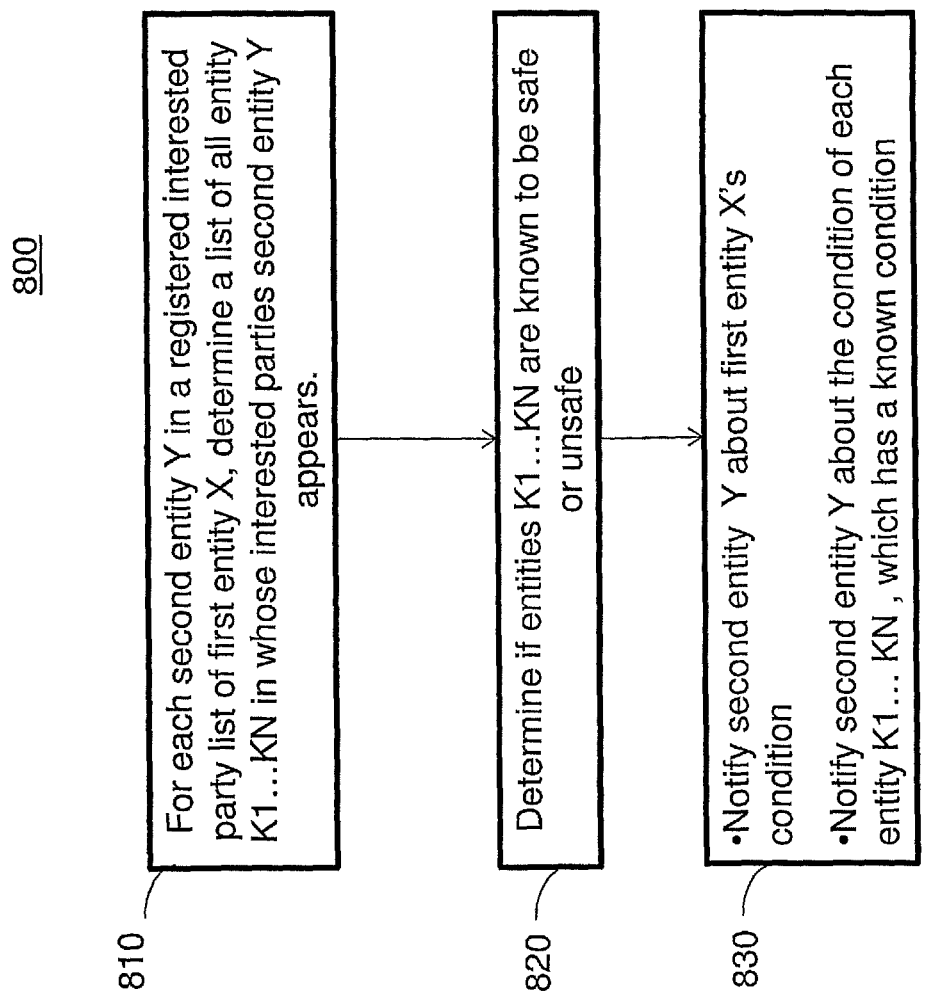

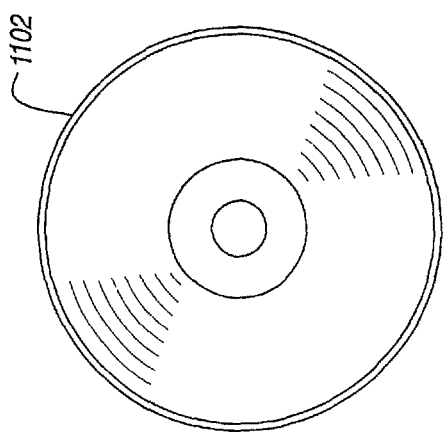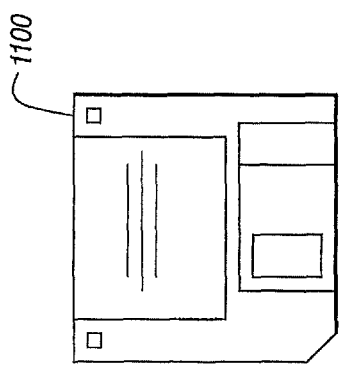
Fig. 11

SYSTEMS, METHODS, AND COMPUTER PROGRAM PRODUCTS FOR REPORTING CONDITION OF FIRST ENTITY TO SECOND ENTITY

CROSS REFERENCE TO RELATED APPLICATION

The present application is a continuation application of U.S. application Ser. No. 13/662,295, filed on Oct. 26, 2012, the entire contents of which are incorporated herein by reference.

BACKGROUND OF THE INVENTION

1. Field of the Invention

The present invention generally relates to a method and apparatus for reporting a condition, and more particularly to system, method, and computer program product for reporting a condition of a first entity to a second entity.

2. Description of the Related Art

Typical reporting systems simply attempt to contact a person that is or is believed to be directly affected by a situation, event, hazard, occurrence, etc. In some typical systems, if for example, a person needs help as a result of the situation, the system can attempt to contact another person in order to provide aid to the person in need. These systems may also allow the person who is believed to be directly affected by the situation to be made aware of their plight. In other situations, a single designated party is contacted in case of an emergency or accident—examples include health care proxies, emergency contacts listed in health care forms, motor vehicle registration forms, etc.

These conventional technologies, however, fail to consider third parties or other close parties who may be concerned about the person's well-being. Given the vast amount of structured and unstructured information that is available today, others, who are aware (or believe they are aware) of a location of the person, may be concerned if they become aware of an event near the area where the person is (or is believed to be) located. For example, structured information is widely available through, police reports, accident reports, weather reports, road condition reports, etc. In addition to the above-mentioned structured information, unstructured information is also available through news reports on the internet, including photos and videos, radio and media broadcasts, along with other unstructured information, such as, for example, blogs, posts, tweets, updates, media postings, at a number social networking sites.

As a result of this widely available information, those who are concerned for the well-being of the person may become concerned for the well being of the person or entity whose condition is believed to be affected. However, those who are concerned have to resort to conventional technology in order to ease their concerns. For example, they may try to contact the person to inquire about their condition or they may have to wait for that person to contact them. Similarly, they may have to wait until they become aware of information regarding the condition of the person from a source other than the person, e.g., a news report, a social media posting, a health care worker, etc.

That is, before a concerned party relying on conventional technologies is able to confirm the person's condition, they may be required actually make contact with the person or wait until they receive additional information regarding that person's condition. As a result, the concerned party may have to wait for a substantial amount of time before they are able to ascertain the condition of the person and before they are able to ascertain whether or not the person has even been affected by the situation or event. In addition, it may be too late to take additional action or provide help to the affected person with the current mechanisms.

Accordingly, there is a need for an improved system and method of reporting a condition of a first entity to a second entity.

SUMMARY OF THE INVENTION

In view of the foregoing and other exemplary problems, drawbacks, and disadvantages of the conventional methods and structures, an exemplary feature of the present invention is to provide a method and structure in which a condition of a first entity is reported to one or more second entities in a more effective manner as compared with conventional technologies.

A first exemplary aspect of the present invention includes a method of reporting a condition of a first entity to a second entity. The method includes determining, as performed on a processor in a computer system, the condition of the first entity based on an aggregation of structured and unstructured information and entity-activity information of the first entity; and reporting the condition of the first entity to the second entity.

Another exemplary aspect of the present invention includes a method of reporting a condition. The method includes monitoring, as performed by a processor in a computer system, a location of a first entity; obtaining location information of the first entity, based on the location of the first entity; aggregating a list of events based on one or more sources of structured or unstructured information; determining a location of events in the list of events, based on information including the unstructured information; obtaining location information of the events, based on the location of events in the list of events; comparing the location information of the events with the location information of the first entity; determining a condition of the first entity based the comparison; and reporting the condition of the first entity to a second entity.

Another exemplary aspect of the present invention includes a computer program product for reporting a condition of a first entity to a second entity. The computer program product includes a computer readable storage medium having computer readable program code embodied therewith. The computer readable program code includes computer readable program code configured to determine the condition of the first entity based on structured or unstructured information and entity-activity information of the first entity; and computer readable program code configured to report the condition of the first entity to the second entity.

Another exemplary aspect of the present invention includes a computer program product for reporting a condition. The computer program product includes a computer readable storage medium; first program instructions to monitor a location of a first entity; second program instructions to obtain location information of the first entity, based on the location of the first entity; third program instructions to aggregate a list of events based on a source of structured or unstructured information; fourth program instructions to determine a location of events in the list of events, based on information including the unstructured information; fifth program instructions to obtain location information of the events, based on the location of events in the list of events; sixth program instructions to compare the location information of the events with the location information of the first entity;

seventh program instructions to determine a condition of the first entity based the comparison; and eighth program instructions to report the condition of the first entity to a second entity. The first through eighth program instructions are stored on the computer readable storage medium.

Another exemplary aspect of the present invention includes a system of reporting a condition of a first entity to a second entity. The system includes a processor that executes instructions to determine the condition of the first entity based on an aggregation of structured and unstructured information and entity-activity information of the first entity; and a reporting unit that reports the condition of the first entity to the second entity.

Another exemplary aspect of the present invention includes a system of reporting a condition. The system includes a processor that executes instructions to monitor a location of a first entity; a location determination unit that obtains location information of the first entity, based on the location of the first entity; an event monitoring unit that aggregates a list of events based on one or more sources of unstructured information, determines a location of events in the list of events based on structured or information including the unstructured information, and obtains location information of the events based on the location of events in the list of events; a condition determination unit that compares the location information of the events with the location information of the first entity, and determines a condition of the first entity based the comparison; and a reporting unit that reports the condition of the first entity to a second entity.

Another exemplary aspect of the present invention includes an apparatus that reports a condition of a first entity to a second entity. The apparatus includes a processor; a reporting unit; and a computer readable storage medium having computer readable program code embodied therewith, the computer readable program code causing the processor to determine the condition of the first entity based on structured or unstructured information and entity-activity information of the first entity, and to report the condition of the first entity to the second entity via the reporting unit.

Another exemplary aspect of the present invention includes a device that reports a condition. The device includes a storage unit that stores instructions; and a processor that executes the instructions stored in the storage unit. When the processor executes the instructions stored in the storage unit, the device monitors a location of a first entity, obtains location information of the first entity based on the location of the first entity, aggregates a list of events based on a source of structured or unstructured information, determines a location of events in the list of events based on information including the unstructured information, obtains location information of the events based on the location of events in the list of events, compares the location information of the events with the location information of the first entity, determines a condition of the first entity based the comparison, and reports the condition of the first entity to a second entity.

With its unique and novel features, the present invention may provide a system and method that determines a condition of the first entity and reports the condition of the first entity to one or more second entities in a manner that is an improvement as compared to conventional technologies.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 8 illustrates an exemplary system and method for aggregating notifications 800, according to an exemplary aspect of the present invention;

FIG. 11 illustrates typical storage media 1100, which may be used to store instructions for implementing the inventive and novel aspects disclosed herein.

DETAILED DESCRIPTION OF EXEMPLARY EMBODIMENTS OF THE INVENTION

Figure 1:
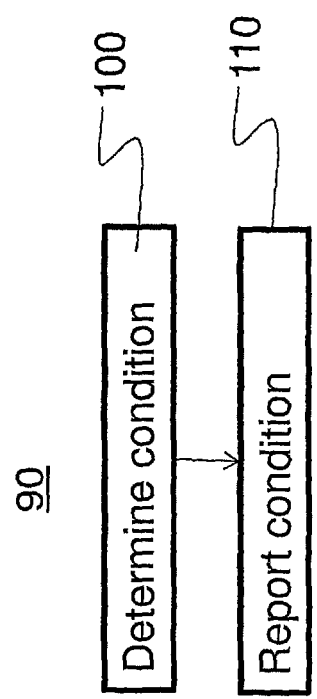
FIG. 1 illustrates an exemplary system and method 90, according to an exemplary aspect of the present invention.

Referring now to the drawings, and more particularly to FIGS. 1-11, there are shown exemplary embodiments of the method and structures according to the present invention.

As described herein, a first entity may designate one or more second entities. In some exemplary embodiments the first entity may designate the second entities by registering them. If the first entity is near an "event", then a second entity may be notified. A location of the first entity may be periodically obtained or constantly monitored.

An event may include, for example, any situation, accident, calamity, disaster, hazard, occurrence, obstacle, attack, shortage, outage, crash, wreck, dangerous development, etc. whether expected or not. Of course, one having ordinary skill in the art would recognize that an event is not limited to the above mentioned exemplary events.

A list of events, such as, disasters, accidents, obstructions, obstacles, weather patterns, etc., may be obtained or complied from structured reports mentioned earlier and unstructured information from news media, event reports, social media etc. One having ordinary skill in the art will recognize that this list may be derived from any known method for unstructured analytics, text analytics, noisy text analytics, image analytics, video analytics, speech to text, social media analytics, etc.

Structured reports can be structured in the sense that they may have certain data fields, e.g., time and location, and some metadata relative to what the report pertains. Structured reports can also have unstructured portions, as well, e.g., notes, etc.

If the location of the first entity does not match (or is not within a predetermined condition-reporting area) any item in the event list, then the second entity may not need to be notified. In some exemplary embodiments, however, the second entity is notified of the condition of the first entity. For example, the second entity may be notified that the first entity has a "safe" condition or was not affected by one or more events.

If the first entity is currently in (or was previously in an event area), e.g., disaster area, but entity-activity information indicates that the first entity is moving or communicating, e.g., made a call after the event, the condition of the first entity may be inferred and reported. For example, if the first entity makes a call after the occurrence of an event, then the condition of the first entity may be inferred as "safe" and the designated second entities may be notified as such.

Similarly, other dynamic data can used to infer the condition of the first entity. For example, information relating to purchases or transactions, such as for example, credit card transactions, store transactions, bank transactions, e-commerce site transactions, a transactions made with an electronic wallet associated with a mobile phone or other computing device, etc., can indicate that the first entity is safe. Further, information relating to mobile applications and when they were last used can be used to indicate that the first entity is safe. For example, if the first entity has played a game, is playing a game, is browsing photos, consuming mobile data, etc., after the occurrence of the event, then the condition of the first entity may be inferred as "safe" and the designated second entities may be notified as such.

If the condition of the first entity is unsure, or if a status of the condition of the first entity is unsure, e.g., not sure if the first entity is safe, any one or more of the following may occur: a dialog may be initiated with the first entity; the first entity may be notified about the event in their vicinity; one or more questions may be asked to the first entity in order to attempt to determine the condition of the first entity. This information may be relayed to the designated second entities. As described below, the aforementioned condition determination features are not limited to those described above.

The location information of the first entity may be obtained in various ways, e.g., location of the mobile phone of the first entity, checkins of the first entity on social networks, credit card or other financial transactions of the first entity, detection of the first entity on one or more cameras, tickets purchased for events by the first entity, the calendar of the first entity, active use of applications or services that can be detected by back end servers, e.g., still playing a video game, etc. One having ordinary skill in the art will recognize that any known system or method of obtaining location information of the first entity may be used, and that the above mentioned examples are merely for exemplary purposes (e.g., they are not intended to be limiting).

Referring now to FIG. 1, at block 100 the condition of the first entity is determined based on structured and unstructured information and entity activity information of the first entity. At block 110, the condition of the first entity is reported to one or more second entities. Block 110 is also referred to herein as "a reporting unit" and may be integrated into the system as software, a circuit, or a combination thereof.

The first entity may, in some exemplary embodiments, include a person, an animal, a vehicle, a product, an item, a central processing unit (CPU) on a computer, a business, a service, any tangible item, such as, for example, a traffic light, an overpass, a bridge, a traffic sign, a cargo container, a ship, etc. The first entity may, in some exemplary embodiments, include a group of any one or more of the aforementioned exemplary first entities.

The second entity may, in some exemplary embodiments, include any one or any one or more of the aforementioned exemplary first entities.

As described above, unstructured information may be from any number of sources. As used herein, and as would be understood by one having ordinary skill in the art, unstructured information may include any information that does not have a formally defined structure. In other words, unstructured information may include information having a structure that is implied, a structure that is not helpful for processing a relevant task, and even, a structure that is unanticipated or unannounced. That is, unstructured information as used herein may include information that does not have a predefined data model, e.g., is not structured based on a predefined form.

The condition of the first entity may include a level of safeness of the first entity, a location of the first entity, an activity of the first entity, an inactivity of the first entity, an event occurrence, a non-occurrence of an expected event, an occurrence of a disaster, a deviation from an expected travel pattern, etc.

Figure 2:
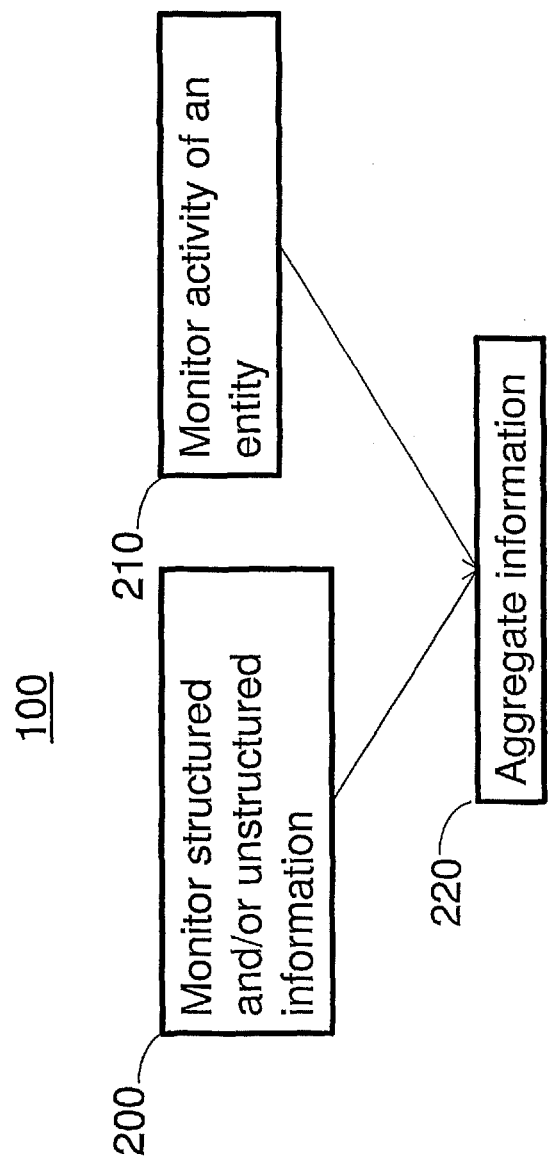
FIG. 2 illustrates an exemplary system and method for determining a condition 100, according to an exemplary aspect of the present invention.

Referring now to FIG. 2, there is shown an exemplary embodiment of block 100. At block 200, any one or more sources of structured and unstructured information are monitored. By monitoring the sources of structured and unstructured information, information regarding the condition of the first entity may be able to be obtained. This information may be referred to hereinafter as "condition-related information." As would be appreciated by one having ordinary skill in the art, any method of monitoring or data mining may be used when monitoring the one or more sources of unstructured information.

At block 210, an activity of the first entity is monitored. By monitoring an activity of the first entity, it may be possible to obtain information regarding the first entity's activity. This information may be referred to herein as "entity activity information" or "user information activity."

The activity of the first entity that is monitored may include any activity that is able to be monitored. For example, electronic activity such as, telephone activity (calls and texts), social network activity (postings, updates, Tweets®, e-mail activity, event postings, status updates, electronics receipts, GPS tracking, internet activity, purchases, transactions, changes in location, etc. As would be appreciated by one having ordinary skill in the art, any known method for monitoring the aforementioned activities may be employed.

Furthermore, the activity of the first entity may be determined based on either explicit feedback or implicit feedback from the first entity or both explicit and implicit feedback.

In addition, in some exemplary embodiments, a status of the condition of the first entity may be determined based on the entity activity information. This status may include, for example, information regarding the condition of the first entity. The information regarding the condition of the first entity, may include, for example, a time that a same status has remained for a particular condition, a message regarding the condition of the first entity.

For example, the first entity, a designated agent of the first entity, or a central processing unit on a computer may post a message regarding the condition of the first entity. As would be appreciated by one having ordinary skill in the art, any known method may be used to add, modify, or delete a status of the condition of the first entity.

This status of the first entity may be reported to the third entities at block 110, as part of the condition.

At block 220, the entity activity information and the condition-related information are aggregated in order to determine the condition of the first entity. If the first entity is not affected by studying the various sources of information related to the location of the entity, then the entity is deemed to be safe. First all event information pertaining to the entity's location are aggregated. This includes accidents, weather reports, health outbreaks, riots, etc. For example if no aggregated event of concern is reported from structured or unstructured data around the entity's location, then the entity is deemed to be safe. If an accident is reported in the vicinity of the entity, but the entity is still moving or making transactions, etc., the entity is deemed safe. The entity's recent activities are aggregated from various pieces of information, call records, transaction records, movement records, etc., to see if the aggregation gives the system sufficient evidence to deem the entity to be safe.

Figure 3:
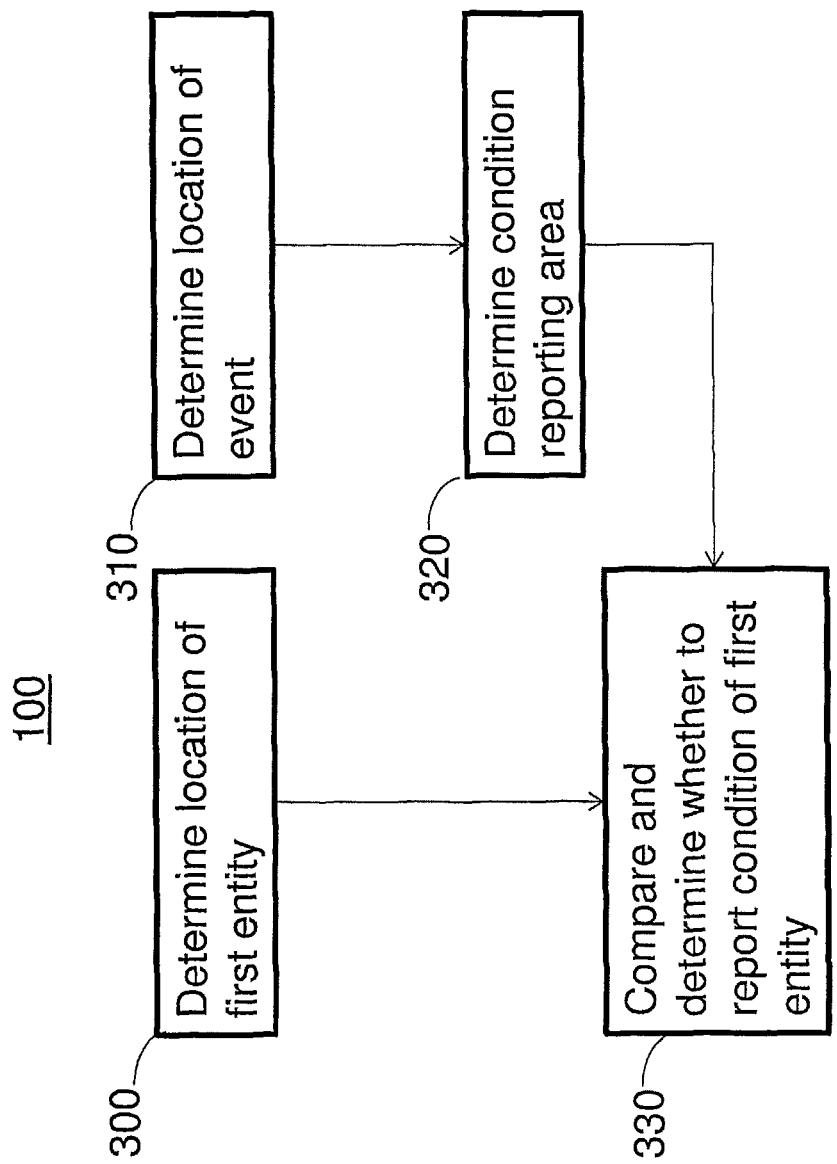
FIG. 3 illustrates an exemplary system and method for determining a condition 100, according to an exemplary aspect of the present invention.

In FIG. 3, another exemplary embodiment of block 100 is shown. At block 300, a location of the first entity is determined. The location of the first entity may be determined based on the entity activity information. Block 300 is also referred to herein as "a location determination unit" and may be integrated into the system as software, a circuit, or a combination thereof.

As would be appreciated by one having ordinary skill in the art, any known method of determining the location of the first entity may be used. Examples include GPS, cellular phone position via cell tower association records, WiFi connections, calendar information, and transactional information such as subway swipes, lunch purchases, toll payments, etc.

At block 310, a location of an event is determined. The location of the event may be determined based on unstructured information or explicit feedback from the first entity or any other entity. As would be appreciated by one having ordinary skill in the art, any known method of determining the location of the event may be used.

At block 320, a condition reporting area is determined. The condition reporting area is determined based on a threshold distance from the event location. Specifically, in some exemplary embodiments, if a distance between the location of the first entity and an event location is determined to be less than or equal to a distance between the event location and a threshold distance, then the first entity is within the condition reporting area.

Blocks 310 and 320, alone or in combination, may be referred to herein as "an event monitoring unit" and may be integrated into the system as software, a circuit, or a combination thereof.

At block 330, the location of the first entity is compared with the location reporting area (or, in other exemplary embodiments, compared with the location of the event). Block 330 is also referred to herein as "a condition determination unit" and may be integrated into the system as software, a circuit, or a combination thereof.

If the first entity is within the condition reporting area, then the condition of the first entity may be reported to the one or more third entities. For example, the condition of the first entity that is within the condition reporting area may be reported as "in danger" or "near the event" or the like. Events may have a region of influence associated with them, e.g., a tornado with a predicted path, a thunderstorm with a region of maximum damage, an airport or shopping mall, rampage along a freeway, etc.

On the other hand, if the location of the first entity is determined to be outside of the condition reporting area, then the condition of the first entity does not necessarily need to be reported. However, in some exemplary embodiments, the condition of the first entity is reported to the one or more third entities. For example, the condition of the first entity that is outside of the condition reporting area may be reported as "safe from danger" or "not near the event" or the like.

Figure 4:
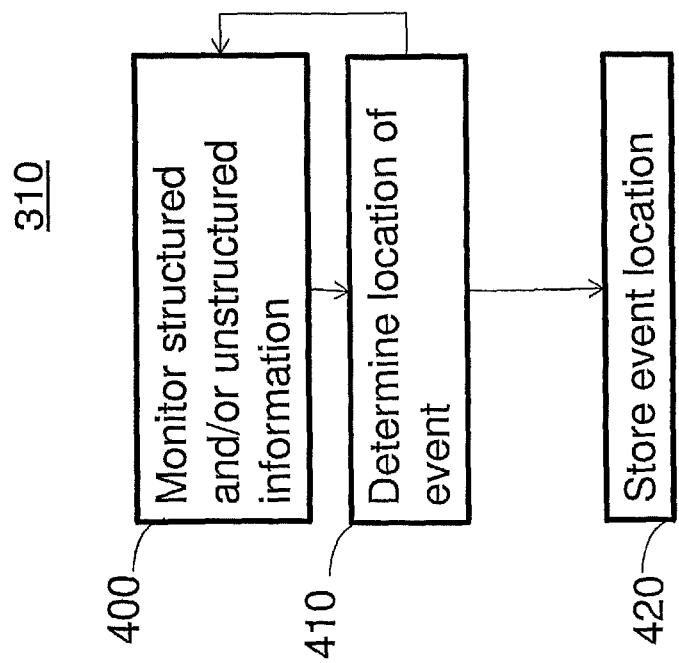
FIG. 4 illustrates an exemplary system and method for determining a location of an event 310, according to an exemplary aspect of the present invention.

Referring now to FIG. 4, which depicts an exemplary embodiment of block 310, at block 400, one or more sources of structured and unstructured information are monitored. At block 410, the location of an event is determined. Each of these is substantially the same as discussed above, and therefore, a duplicative discussion will be omitted. A feedback loop is provided from block 410 to block 400. This allows the location of multiple events to be stored at block 420. This may be referred to herein as a "list of events" or a "list of current events."

At block 420, once the location of an event is determined, the location of the event is stored at block 420. If the location of multiple events is determined, then the location of each event of the list of events is stored at 420.

Similar to the above, the location information of the events is compared with the location information of the first entity, and the determination of the condition of the first entity is made based on the aforementioned comparison. In some exemplary embodiments, only if the location of the first entity is within the determined condition reporting area is the condition of the first entity reported to the one or more second entities. In other exemplary embodiments, a status of the condition of the first entity as it relates to each event is reported to the one or more second entities.

For example, if the first entity is involved in an earthquake, but not in a flood, the one or more second entities would be notified of the respective conditions of the first entity.

Figure 5:
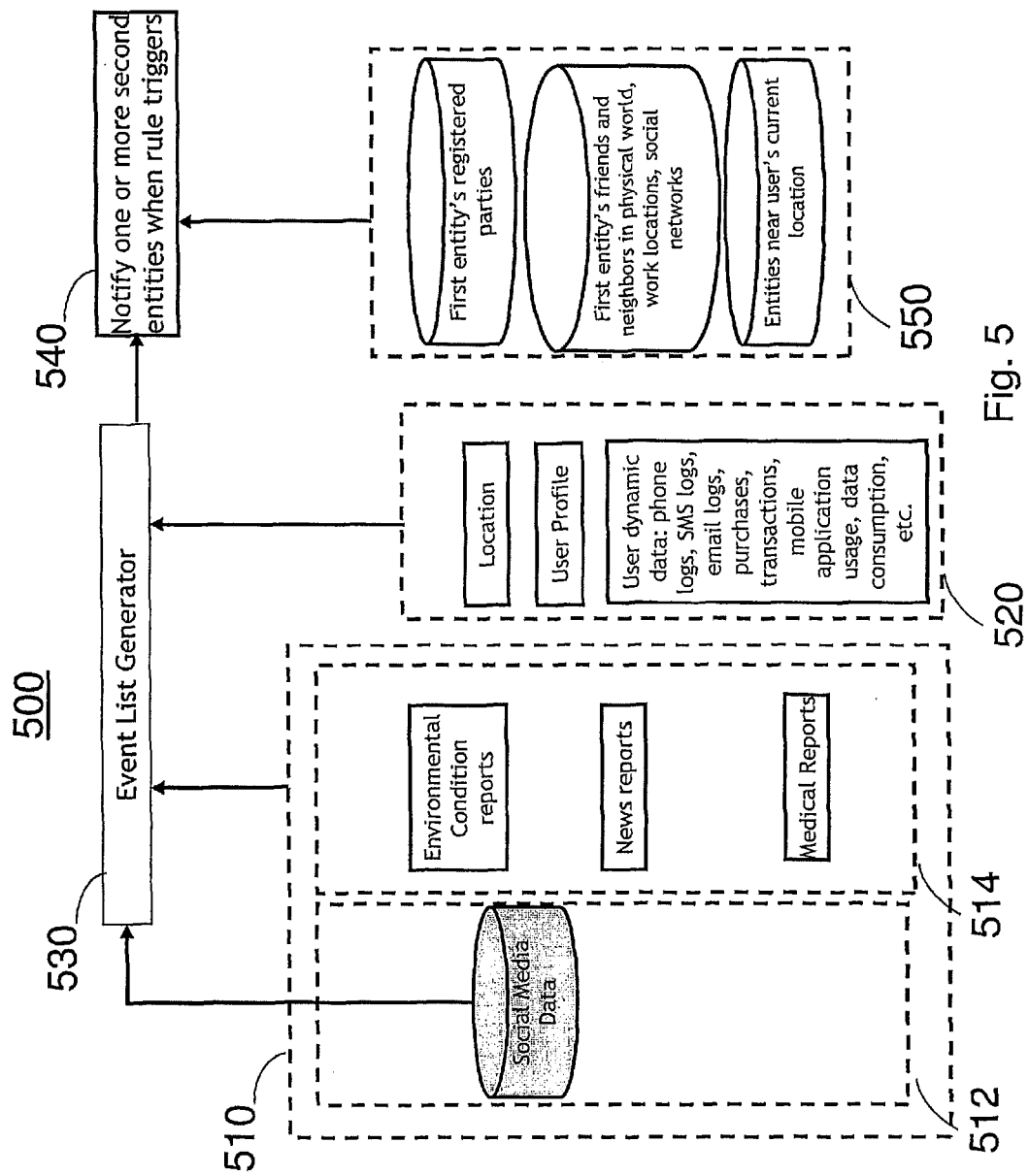
FIG. 5 illustrates an exemplary event monitoring architecture 500, according to an exemplary aspect of the present invention.

Referring now to FIG. 5, there is provided an exemplary architecture for event monitoring 500. At block 510, there is shown exemplary sources of structured and unstructured data, which may be monitored. For example, one source of unstructured data may be from social media data 512 as described above. More than one source of social media data may monitored at once. Similarly, one or multiple sources of unfiltered data from external sources 514 may be monitored. The external conditions may include reports about environmental conditions, e.g., weather, hurricane, tsunami reports, etc., news reports, e.g., accident reports, crime reports, etc., medical reports, flu, SARS reports, etc. The reports regarding external conditions are simply provided for exemplary proposes and are not intended to be limiting.

At block 520, there is shown exemplary embodiments of data relevant to the first entity. In some exemplary embodiments, this data may be personal data. For example, this data may include the location of the first entity, a profile of the first entity, and/or dynamic data of the first entity. The dynamic data may include, for example, phone logs, SMS logs, e-mail logs, call logs, search history, purchases, transactions, mobile application usage, data consumption, etc.

Each of the data relevant to the first entity from block 520 and the unfiltered data from 510 is input into an event list generator 530. The event list generator monitors the information from 510 and the data relevant to the first entity from 520, and determines the location of one or more events and then stores the location of the events in a memory. In some exemplary embodiments, the event list generator is embodied by blocks 300, 310, 320, and 330 of FIG. 3.

In some exemplary embodiments, there is provided a registration process, which is described below, and the event list generator 530 generates an event list that is pertinent to each registered user (e.g., each registered first entity) and to a status determination of the condition of each registered user.

In some exemplary embodiments, the first entity may set rules that will determine if their condition will be reported to the one or more second entities. As is shown at block 540, the one or more second entities are notified if a rule for a notification triggers. For example, if a change in a condition or in a status of a condition of the first entity occurs, then a rule for notification may trigger.

In some exemplary embodiments, the first entity may set rules that will determine if a specific second entity or a specific group of second entities will receive a report of the condition of the first entity. This feature may be helpful if the first entity wants to alert one or more second entities of their condition, but not another second entity or group thereof. Certain type of events may trigger notifications to one set of people, e.g., being caught in a hailstorm can trigger notifications to near family and not to friends across the country.

In another exemplary embodiment, each of the one or more second entities can set individual rules, which determine if and when the condition of the first entity is reported to them. Similarly, each of the one or more second entities can set a filter, which filters notifications regarding the condition of the first entity. This feature may be helpful, if, for example, the condition of the first entity is reported at a rate that the second entity believes is too often. However, the filters can be set for any other reason and the above example is not intended to be limiting.

As is shown in block 550, the one or more second entities that are notified based on the triggering of a notification may be, for example, second entities that have registered to be notified; friends, neighbors (in the physical world, at school, at work, in one or more social networks, etc.); and entities who are near (e.g., within a predetermined threshold) the location of the first entity.

Figure 6:
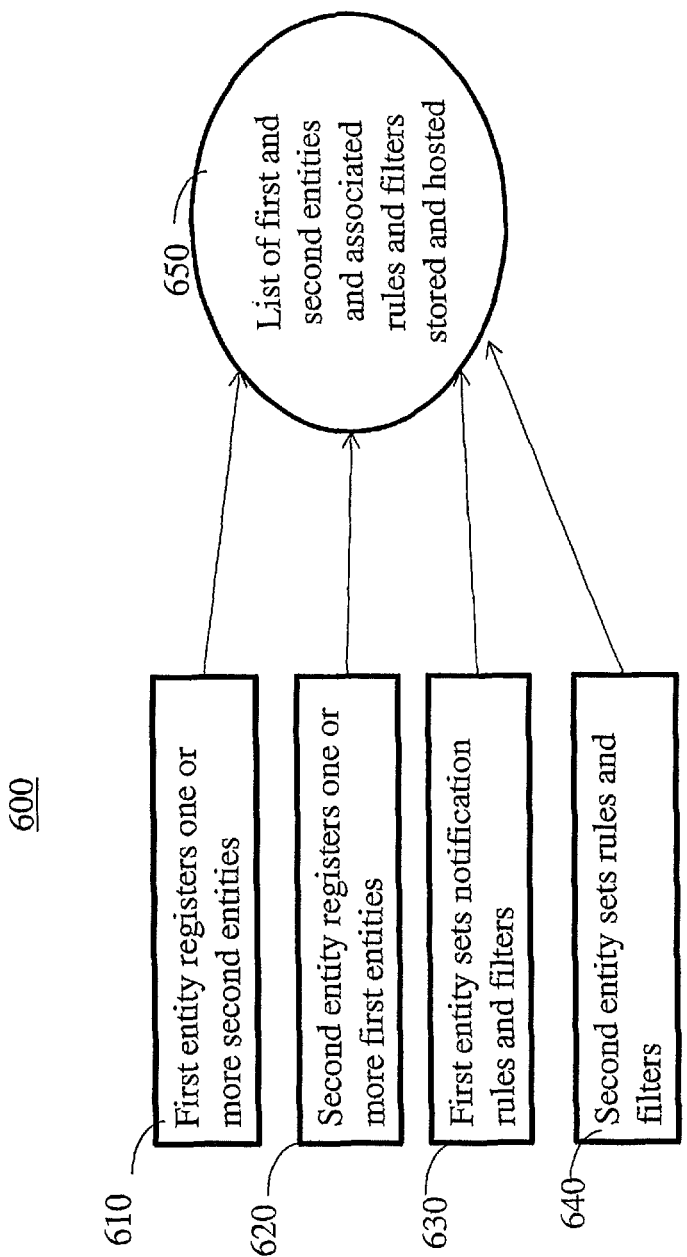
FIG. 6 illustrates an exemplary system and method for registering entities, rules, and filters, and storing and hosting this information 600, according to an exemplary aspect of the present invention.

Referring now to FIG. 6, there is shown an exemplary system and method of user registration (e.g., entity registration) 600. The exemplary system 600 may also be referred to herein as "a designation unit" and may be integrated into the system as software, a circuit, or a combination thereof.

At block 610, a first entity registers one or more second entities for whom the first entity wishes to have notified regard the condition of the first entity. At block 620, the second entity registers one or more first entities in whose condition they wish to have reported to them.

At block 630, the first entity sets rules that determine if the second entities will receive notifications on a status or a condition of their registered (or their to be registered) parties. Similar to the above discussion, these rules may be flexible and may be set per second entity or per group of second entities. At block 640, the second entity sets rules that determine if the second entity will receive notifications on a status or a condition of their registered (or their to be registered) parties. As discussed above, these rules may also be flexible.

In some exemplary embodiments, if a second entity sets a rule for a first entity, the first entity may approve the rule of the second entity before the rule goes into effect. Similarly, each of the first and second entities may set rules, which block the reports of the condition of the first entity from being reported to the second entity.

At block 650, the list of second entities and the list of first entities registered by a first and second entity respectively, is stored and hosted. Similarly, the rules set by the first and second entity are also stored and hosted at block 650.

In some exemplary embodiments, the information stored at block 650 may be stored and hosted on a cloud server. In other exemplary embodiments, the information stored at block 650 may be stored in a network and hosted on a network. In still other exemplary embodiments, the information may be stored on the memory of a computer. As would be appreciated by one having ordinary skill in the art, the above exemplary embodiments are for illustrative purposes and are not intended to be limiting. That is, the rules and the registered lists of entities may be stored using any known medium and may be hosted in any known manner.

The information that is stored and hosted at block 650 may be output to block 100 of FIG. 1. That is, the first entity whose condition is determined at block 100 is determined from the information stored and output from block 650. Similarly, the one or more second entities to which the condition of the first entity is reported at block 110 are determined based on the information stored and output from block 650.

Figure 7A:
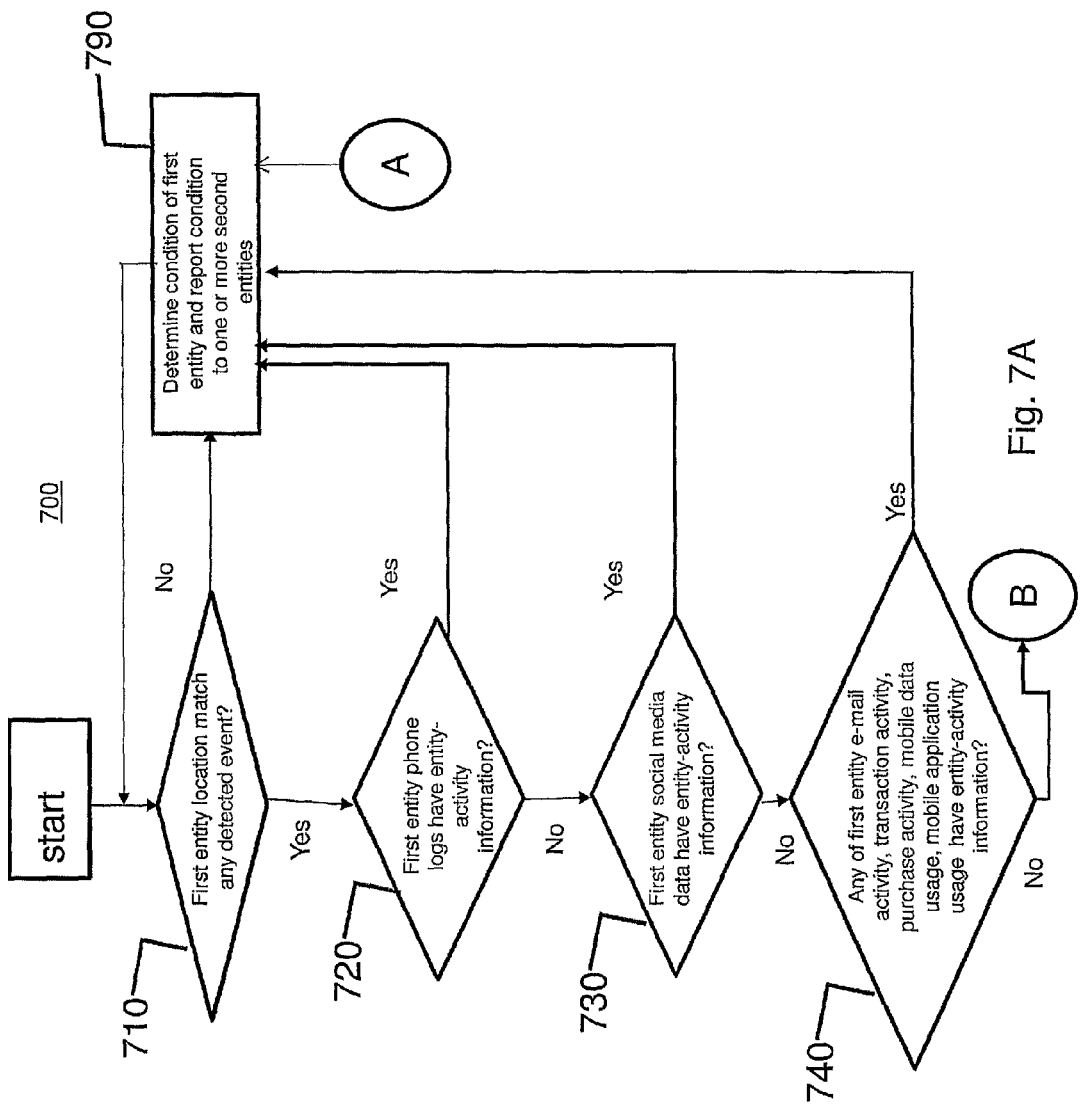
FIG. 7A illustrates an exemplary system and method for determining a condition of a first entity 700, according to an exemplary aspect of the present invention.
Figure 7B:
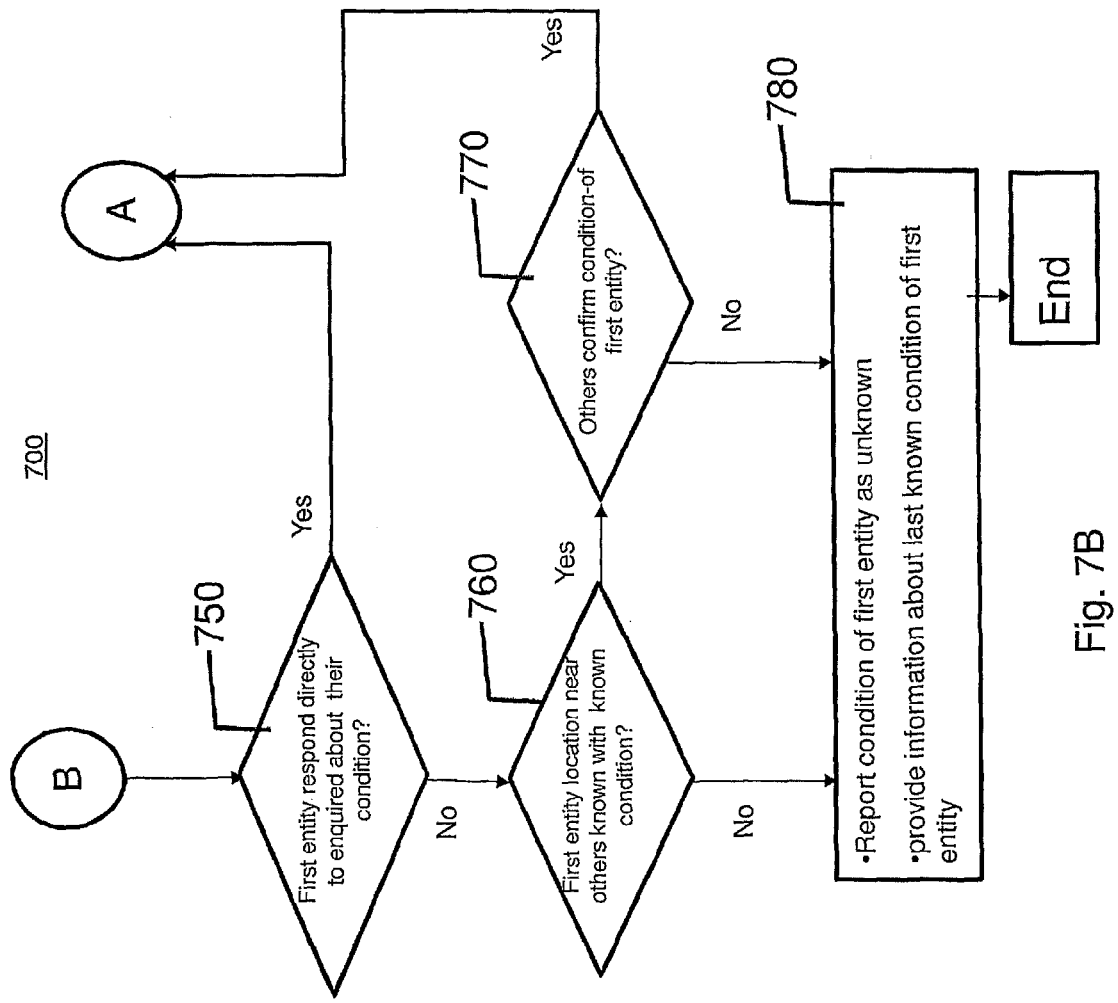
FIG. 7B illustrates an exemplary system and method for determining a condition of a first entity 700, according to an exemplary aspect of the present invention.

Referring now to FIGS. 7A and 7B, there is shown an exemplary embodiment of determining the condition of the first entity. At block 710, a determination of whether or not location of the first entity matches (e.g., is within the condition-reporting area) any event of the event list. If the location of the first entity is not within the condition-reporting area of any event, then the condition of the first entity is determined and reported to one or more second entities at block 790. For example, if a disaster event occurred and the location of the first entity was not within the condition-reporting area, then the condition of the first entity may be reported to the one or more second entities as "safe" or "not near the disaster."

On the other hand, if the location of the first entity is determined to be within the condition-reporting area, then another determination is made. For example, at block 720, a determination of whether phone logs of the first entity include entity-activity information regarding the condition of the first entity is made. In the same example, if the phone logs indicate that the first entity is "safe," then the condition of the first entity is reported to one or more second entities at block 790. However, if the phone logs do not include entity-activity information regarding the condition of the first entity, then another determination is made at block 730.

At block 730, a determination of whether social media data of the first entity (e.g., unstructured information from one or more social media sites regarding the first entity) contain entity-activity information regarding the condition of the first entity. In the same example, if the social media data of the first entity indicates that the first entity is safe, then a determination of the condition of the first entity and reported to the one or more second entities at block 790. The social media data of the first entity may be, for example, a Tweet® from the Twitter® account of the first entity, or a wall posting or status update to the Facebook® profile of the first entity. Similarly, as described below with respect to blocks 760 and 770, the Tweet® or wall posting or status update may be from a social media account of another entity. The aforementioned examples of social media data are exemplary and are not intended to be limiting.

On the other hand, if the social media data of the first entity does not include entity-activity information, then another determination is made at block 740. At block 740, a determination of whether any one or more of e-mail activity of the first entity, transaction activity of the first entity, purchase activity of the first entity, mobile data usage by the first entity, mobile application usage by the first entity, etc., includes information regarding the condition of the first entity. In the same example, if the e-mail activity indicates that the first entity is "safe," then the condition of the first entity is reported to one or more second entities at block 790. However, if the e-mail activity does not include the aforementioned information regarding the condition of the first entity, then another determination is made at block 750.

Referring now to FIG. 7B, the first entity may be directly requested to provide information regarding their condition. At block 750, a determination of whether the first entity has responded to the direct inquiry is made. If the first entity has responded to the direct inquiry, then the condition of the first entity is determined based on their response, and is reported to the one or more second entities at block 790.

On the other hand, if the first entity fails to respond to a direct inquiry regarding their condition, then another determination is made at block 760.

At block 760, a determination of whether the location of the first entity is near (e.g., within a predetermined threshold) one or more other entities with a known condition. If so, another determination is made at block 770. At block 770, a determination is made as to whether the one or more entities, which have a known condition, can confirm the condition of the first entity.

If the one or more entities can confirm the condition of the first entity, then the condition of the first entity is determined based on the confirmed condition provided by the one or more entities. This determined condition is reported to the one or more second entities at block 790.

On the other hand, if the first entity is not near any other entity, or the one or more other entities that are near the first entity do not know the condition of the first entity, then the condition of the first entity is determined to be unknown. If the condition of the first entity is determined to be unknown, then the condition of the first entity is reported as such to the one or more second entities at block 780. In some exemplary embodiments, information regarding the last known condition of the first entity is also reported to the one or more second entities at block 780.

One having ordinary skill in the art would recognize that the order of determination blocks 720-760 can changed, and that the aforementioned order is simply for illustrative purposes and not intended to be limiting.

Referring now to FIG. 8, there is shown an exemplary system and method for aggregating notifications 800. Each second entity is referred to as Y. The first entity is referred to as X. Other entities in whose interested parties second entity Y appears are referred to as K. There may be N other entities, where N is an integer that is greater than or equal to one. So $K_1 \ldots K_N$ are each interested in knowing the condition of X.

At block 810, for each second entity Y in a registered interested party list of the first entity X, a list of all other entities $K_1 \ldots K_N$ in whose interested parties the second entity Y appears is created. Such lists may be created apriori and kept ready for purposes of efficiency. In such a case they will be updated based on changes of rules and preferences of entities.

At block 820, a determination of the condition of each other entity $K_1 \ldots K_N$ is made.

At block 830, each second entity Y is notified about the condition of the first entity. In some exemplary embodiments, each second entity Y is notified about the condition each other entity K, if the other entity K has a known condition. This method allows grouping of communications whenever possible and reducing the number of interruptions for any one entity. So entity Y will receive notifications of $K_1 \ldots K_N$ in one single communication instead of N different communications. This reduces the load on the communications network, something that is very important in times of calamity and disasters. This is optional and in some cases may not be warranted for other reasons, for example, if one the condition of one of the $K_1 \ldots K_N$ takes too long to obtain, the system may proceed with notifying the rest of $K_1 \ldots K_N$ right away.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
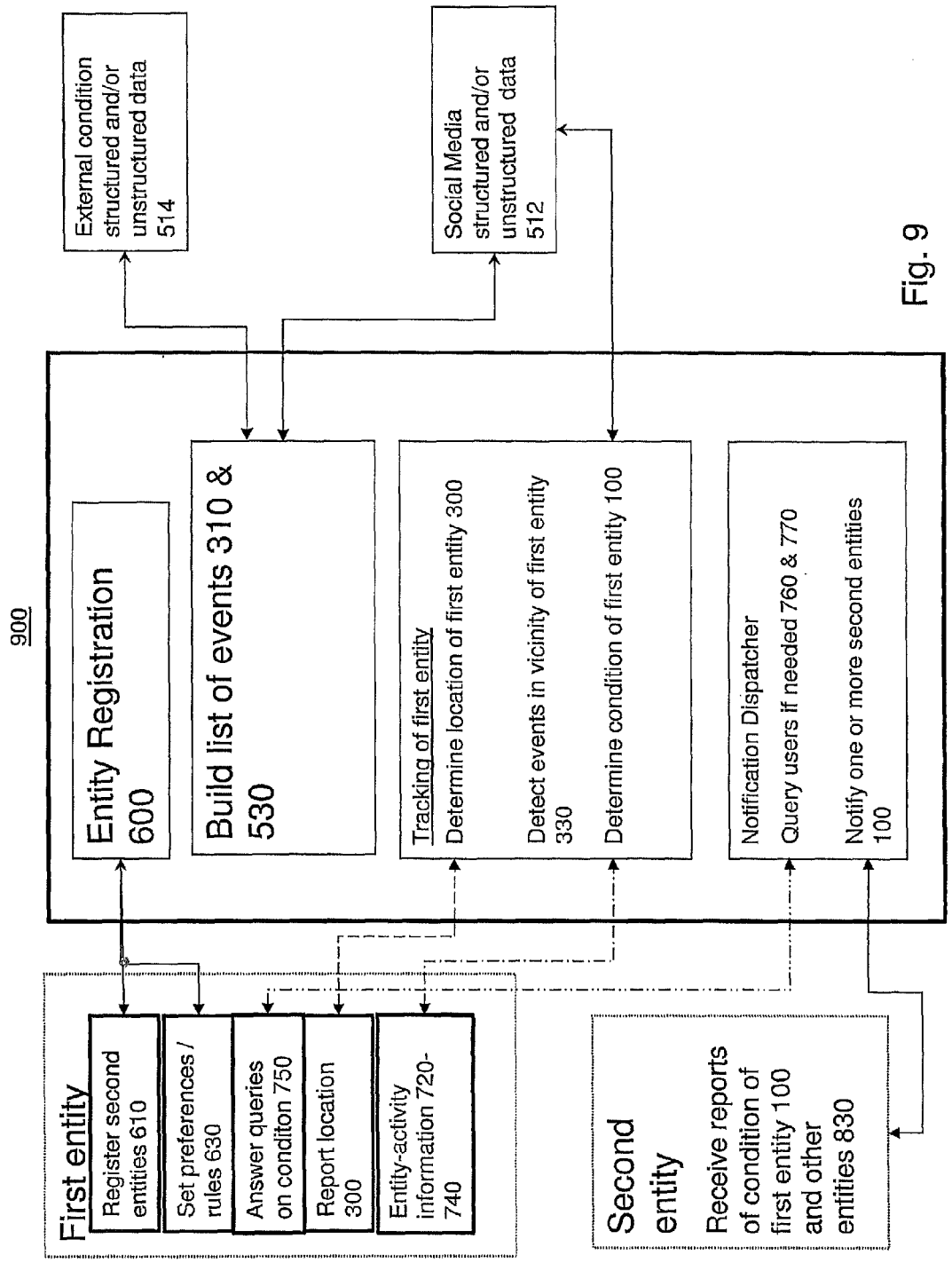
FIG. 9 illustrates an exemplary system and method for event monitoring and condition reporting 900, according to an exemplary aspect of the present invention.

Referring now to FIG. 9, there is provided an overview of an exemplary event monitoring system 900 of the present invention. Each of the features of FIG. 9, have been discussed above, and therefore a duplicate discussion will be omitted.

As described herein, at block 610, a first entity may designate one or more second entities by registering them. Upon being designated by the first entity, a second entity may be notified by the event monitoring system 900 in case the first entity is near an event, for example, a dangerous situation, accident, calamity, etc. The event monitoring system 900 may periodically obtain the location of the first entity 300 and also obtain a list of disasters, accidents etc, by mining news media, event reports, etc. 310 and 530 and put these items into a event list, or a current event list. If the location of the first entity does not match (or is not within a condition-reporting area) any item in the event list no one needs to be notified. If the system notices that the first entity is currently in or was previously in an event area, e.g., disaster area, but that the first entity is moving or communicating, e.g., made a call after the event, it may infer the condition of the first entity as "safe" and start notifying the designated second entities. If the system is unsure of the condition of the first entity or is unsure that the status of the condition of the first entity is safe, the system may initiates a dialog with the first entity, notify the first entity about the event in the vicinity of the first entity, ask one or more questions and determine the condition of the first entity. This information may be relayed to the designated second entities.

The location information may be obtained in various ways, e.g., location of the mobile phone of the first entity, checkins of the first entity on social networks, credit card or other financial transactions of the first entity, detection of the first entity on one or more cameras, tickets purchased for events by the first entity, the calendar of the first entity, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10:
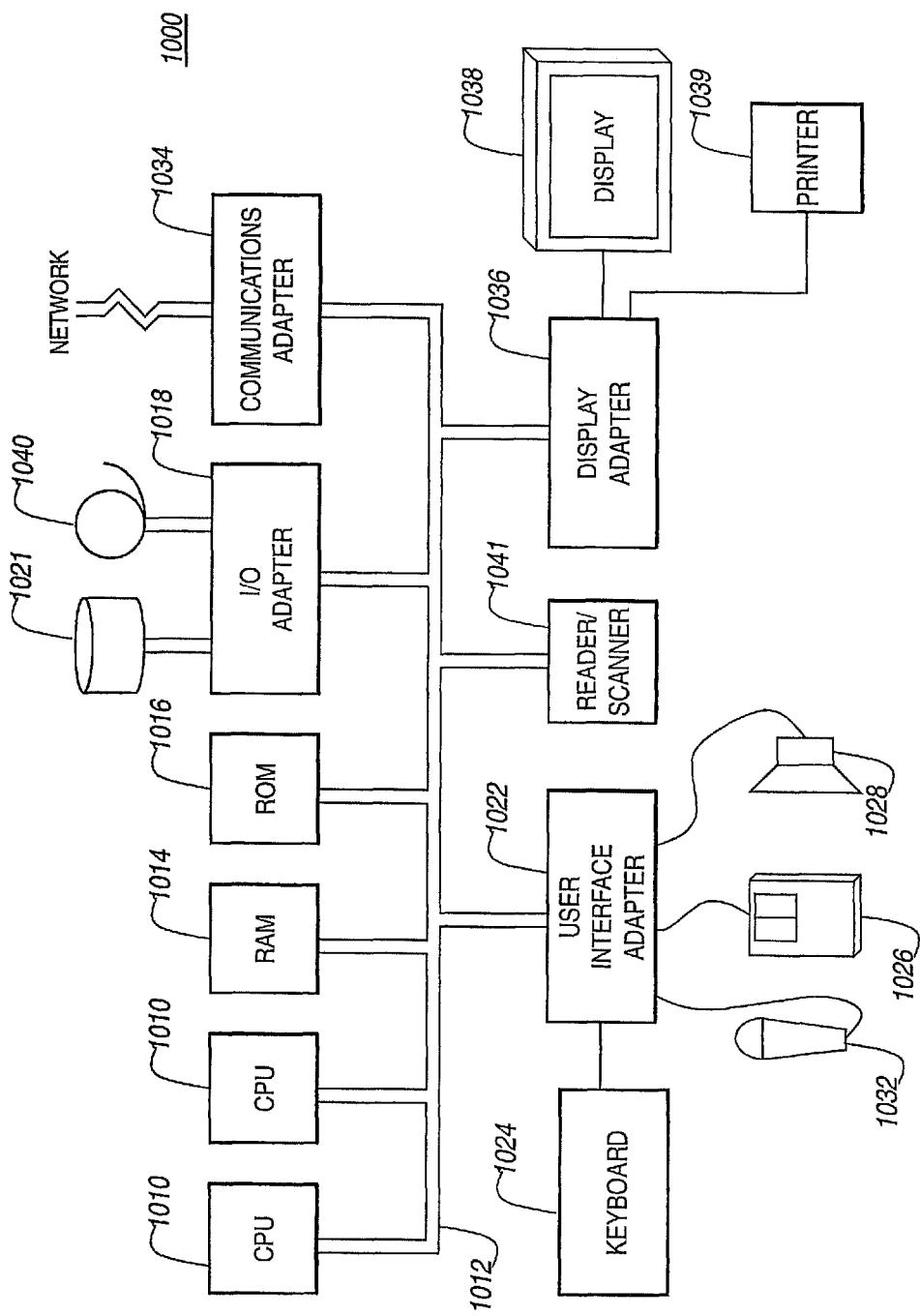
FIG. 10 illustrates a typical hardware system 1000, which may be used for implementing the inventive and novel aspects disclosed herein.

FIG. 10 illustrates a typical hardware configuration 1000 which may be used for implementing the present invention. The configuration has preferably at least one processor or central processing unit (CPU) 1010. The CPUs 1010 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039. Further, an automated reader/scanner 1041 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 1010 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 1010 and hardware above, to perform the method of the invention.

This storage media may include, for example, a RAM contained within the CPU 1010, as represented by the fast-access storage for example. Alternatively, the instructions may be contained in another storage media, such as a magnetic data storage diskette 1100 or compact disc 1102 (FIG. 11), directly or indirectly accessible by the CPU 1010.

Whether contained in the computer server/CPU 1010, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C++, etc.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A system for reporting a condition of a first entity to a second entity, the system comprising:
   a processor that executes instructions to determine the condition of the first entity based on an aggregation of structured and unstructured information and entity-activity information of the first entity; and
   a reporting unit that reports the condition of the first entity to the second entity,
   wherein said condition of the first entity comprises a level of safeness of the first entity.

2. The system according to claim 1, wherein the condition of the first entity is determined by monitoring a source of information to obtain condition-related information, monitoring an activity of the first entity to obtain the entity-activity information, and aggregating the condition-related information and the entity-activity information.

3. The system according to claim 1, wherein the processor executes instructions to monitor an activity of the first entity in order to obtain the entity-activity information.

4. The system according to claim 3, wherein the processor executes instructions to determine the activity of the first entity based on implicit feedback from the first entity.

5. The system according to claim 3, wherein the processor executes instructions to determine the activity of the first entity based on explicit feedback from the first entity.

6. The system according to claim 1, further comprising:
   a location determination unit that determines a location of the first entity based on the entity-activity information; and
   an event monitoring unit that determines a location of a condition reporting area based on the structured or unstructured information,
   wherein the reporting unit reports the condition of the first entity to the second entity, when a distance between the location of the first entity and the location of the condition reporting area is less than or equal to a predetermined threshold distance.

7. The system according to claim 1, further comprising a condition determination unit that determines whether the location of the first entity is within a predetermined distance of a location of one or more other entities,
   wherein the determination of the condition of the first entity is further based on feedback from the one or more other entities, if the location of the first entity is within the predetermined distance of the location of one or more other entities.

8. The system according to claim 7, wherein the reporting unit reports a last known condition of the first entity, if the location of the first entity is not within the predetermined distance of the location of one or more other entities.

9. The system according to claim 1, further comprising a designation unit that designates the second entity from among from a plurality of entities, based on a designation of the first entity.

10. A system for reporting a condition, the system comprising:
    a processor that executes instructions to monitor a location of a first entity;
    a location determination unit that obtains location information of the first entity, based on the location of the first entity;
    an event monitoring unit that aggregates a list of events based on one or more sources of unstructured information, determines a location of events in the list of events based on structured or information including the unstructured information, and obtains location information of the events based on the location of events in the list of events;
    a condition determination unit that compares the location information of the events with the location information of the first entity, and determines a condition of the first entity based the comparison; and
    a reporting unit that reports the condition of the first entity to a second entity,
    wherein said condition of the first entity comprises a level of safeness of the first entity.

11. The system according to claim 10, wherein the condition determination unit further analyzes feedback from the first entity, and determines the condition of the first entity based on the comparison and the analyzed feedback from the first entity.

12. The system according to claim 10, wherein the condition determination unit further determines whether the location of the first entity is within a predetermined threshold distance from a location of an entity having a known condition, and requests the entity to determine the condition of the first entity if the location of the first entity is within the predetermined threshold distance from the location of the another entity.

13. A device that reports a condition, the device comprising:
    a storage unit that stores instructions; and
    a processor that executes the instructions stored in the storage unit,
    wherein, when the processor executes the instructions stored in the storage unit, the device monitors a location of a first entity, obtains location information of the first entity based on the location of the first entity, aggregates a list of events based on a source of structured or unstructured information, determines a location of events in the list of events based on information including the unstructured information, obtains location information of the events based on the location of events in the list of events, compares the location information of the events with the location information of the first entity, determines a condition of the first entity based the comparison, and reports the condition of the first entity to a second entity, and wherein said condition of the first entity comprises a level of safeness of the first entity.

14. The device according to claim 13, wherein, when the processor executes the instructions stored in the storage unit, the device further analyzes feedback from the first entity in order to determine the condition of the first entity.

15. The device according to claim 13, wherein, when the processor executes the instructions stored in the storage unit, the device further determines whether the location of the first entity is within a predetermined threshold distance from a location of another entity having a known condition, and requests another entity to determine the condition of the first entity, if the location of the first entity is within the predetermined threshold distance from the location of the another entity.

16. A method of reporting a condition of a first entity to a second entity, the method comprising:
   determining, as performed on a processor in a computer system, the condition of the first entity based on an aggregation of structured and unstructured information and entity-activity information of the first entity; and
   reporting the condition of the first entity to the second entity,
   wherein said condition of the first entity comprises a level of safeness of the first entity.

17. A computer readable storage medium having computer readable program code embodied therewith, the computer readable program code causing the processor to perform the method of claim 16.

18. The method according to claim 16, wherein the determining of the condition of the first entity comprises:
   monitoring a source of information to obtain condition-related information;
   monitoring an activity of the first entity to obtain the entity-activity information; and
   aggregating the condition-related information and the entity-activity information.

19. The method according to claim 16, further comprising monitoring an activity of the first entity to obtain the entity-activity information.

20. The method according to claim 19, further comprising determining the activity of the first entity based on implicit feedback from the first entity.

21. The method according to claim 19, further comprising determining the activity of the first entity based on explicit feedback from the first entity.

22. The method according to claim 16, further comprising:
   determining a location of the first entity, based on the entity-activity information; and
   determining a location of a condition reporting area, based on the structured or unstructured information,
   wherein, the reporting of the condition of the first entity to the second entity, occurs if a distance between the location of the first entity and the location of the condition reporting area is less than or equal to a predetermined threshold distance.

23. The method according to claim 16, further comprising:
   determining whether or not the location of the first entity is within a predetermined distance of a location of one or more other entities; and
   determining the condition of the first entity based on feedback from the one or more other entities, if the location of the first entity is within the predetermined distance of the location of one or more other entities.

24. The method according to claim 23, further comprising reporting a last known condition of the first entity, if the location of the first entity is not within the predetermined distance of the location of one or more other entities.

25. The method according to claim 16, further comprising designating, from a plurality of entities, the second entity, based on a designation of the first entity.

* * * * *